(12) United States Patent
Leng et al.

(10) Patent No.: US 9,560,567 B2
(45) Date of Patent: Jan. 31, 2017

(54) METHOD AND APPARATUS FOR RECONSTRUCTING THE NETWORK TOPOLOGY IN WIRELESS RELAY COMMUNICATION NETWORK

(75) Inventors: Xiaobing Leng, Shanghai (CN); Jikang Wang, Shanghai (CN); Kaibin Zhang, Shanghai (CN); Shan Jin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1048 days.

(21) Appl. No.: 12/999,972

(22) PCT Filed: Jul. 25, 2008

(86) PCT No.: PCT/CN2008/001370
§ 371 (c)(1),
(2), (4) Date: Dec. 17, 2010

(87) PCT Pub. No.: WO2010/009579
PCT Pub. Date: Jan. 28, 2010

(65) Prior Publication Data
US 2011/0110270 A1 May 12, 2011

(51) Int. Cl.
*H04W 36/22* (2009.01)
*H04B 7/26* (2006.01)
(Continued)

(52) U.S. Cl.
CPC ........... *H04W 36/22* (2013.01); *H04B 7/2606* (2013.01); *H04W 84/18* (2013.01); *H04W 16/08* (2013.01); *H04W 84/047* (2013.01)

(58) Field of Classification Search
USPC .................. 370/254, 255, 328, 331, 338
See application file for complete search history.

(56) References Cited

U.S. PATENT DOCUMENTS 5,504,935 A * 4/1996 Vercauteren ................. 455/438
7,623,863 B2 * 11/2009 Chen et al. .................. 455/436
(Continued)

FOREIGN PATENT DOCUMENTS

CN 1859789 A 11/2006
CN 101068203 A 11/2007
(Continued)

OTHER PUBLICATIONS

International Search Report for PCT/CN2008/001370 dated Apr. 23, 2009.
(Continued)

*Primary Examiner* — Hong Cho
(74) *Attorney, Agent, or Firm* — Fay Sharpe, LLP

(57) ABSTRACT

A solution of reconstructing the network topology according to the traffic related information of each cell is proposed in the present invention, so as to achieve self-optimization of network. The traffic related information of a cell includes the traffic related information applicable to network topology reconstruction, or load related information as is named, including but not limited to time-frequency resource related amount that is used by the traffic data in the cell, traffic throughout of each cell or the wireless channel quality of each cell for transmitting traffic data, etc. The solutions in the present invention realize the network topology reconstruction according to traffic related information of multiple cells, therefore the network capacity and service quality could be effectively improved and the wireless relay communication network is applicable to those areas with unpredictable traffic distribution. And the network topology reconstruction function in the present invention can simplify network planning and network management, so that network deployment cost and maintenance and management expenses could be saved.

12 Claims, 11 Drawing Sheets

(51) Int. Cl.
*H04W 84/18* (2009.01)
*H04W 16/08* (2009.01)
*H04W 84/04* (2009.01)

(56) References Cited

U.S. PATENT DOCUMENTS

| | | | |
|---|---|---|---|
| 8,040,842 B2 | 10/2011 | Nakatsugawa | |
| 2007/0104148 A1* | 5/2007 | Kang et al. | 370/331 |
| 2007/0173258 A1* | 7/2007 | Sano | 455/445 |
| 2007/0264933 A1 | 11/2007 | Kang et al. | |
| 2008/0108377 A1 | 5/2008 | Yoon | |
| 2008/0126536 A1 | 5/2008 | Sakurai | |
| 2009/0312060 A1* | 12/2009 | Bloebaum et al. | 455/566 |
| 2010/0075693 A1 | 3/2010 | Kishigami et al. | |
| 2010/0178925 A1* | 7/2010 | Bernini et al. | 455/446 |

FOREIGN PATENT DOCUMENTS

| | | | |
|---|---|---|---|
| JP | 2000-333257 | | 11/2000 |
| JP | 2002-111579 | | 4/2002 |
| JP | 200387183 | A | 3/2003 |
| JP | 2008-060868 | | 3/2008 |
| JP | 2008-193666 | A | 8/2008 |
| WO | 2005/041348 | A2 | 5/2005 |
| WO | WO 2008/033369 | A2 | 3/2008 |
| WO | WO 2008/033369 | A3 | 3/2008 |

OTHER PUBLICATIONS

Japanese Office Action—Examiner's Office Letter and translation; dated May 29, 2012; dispatched Jun. 4, 2012; 7 pgs.
Supplementary Partial European Search Report for corresponding European application No. 08783561.7, dated Feb. 5, 2015, 9 pages.
Hans-Martin Zimmermann et al., "Dynamic Cell Clustering in Cellular Multi-Hop Networks," Institute of Communication Networks, TU Muenchen, Arcisstr. 21, 0-80290 Mucnchen, Oct. 1, 2006, 5 pages.
Peng Jiang et al., "Self-organizing relay stations in relay based cellular networks," Computer Communications, Department of Electronic Engineering, Queen Mary University of London, London E1 4NS, United Kingdom, Aug. 15, 2008, 9 pages.
"Part 16: Air Interface for Fixed and Mobile Broadband Wireless Access Systems, Multihop Relay Specification," Draft Amendment to IEEE Standard for local and metropolitan area networks, Feb. 29, 2008, 9 pages.
Anton Ambrosy et al., "Self-configuration and self-optimization of 4G Radio Access Networks," Broadband Wireless Access Working Group, Aug. 29, 2007, 9 pages.

* cited by examiner

METHOD AND APPARATUS FOR RECONSTRUCTING THE NETWORK TOPOLOGY IN WIRELESS RELAY COMMUNICATION NETWORK

FIELD OF THE INVENTION

The present invention relates to management device, base station and relay station wireless relay communication network, in particular, to method and apparatus for reconstructing the network topology thereof.

BACKGROUND OF THE INVENTION

Self-organization and multi-hop relays are two operational requirements in the requirements of IEEE802.16m advanced air interface. Here exists a new technical problem, i.e. how to support self-organization mechanisms in WiMAX multi-hop relay network. The self-organization includes two aspects: self-configuration and self-optimization.

So far, solutions for self-organization in non-relay wireless communication network have been proposed in some contributions. But it is not mentioned how to realize self-organization in wireless relay communication network.

It has been proposed in reference document 1 to realize self-optimization by handing over mobile station according to interference condition. It has been proposed in reference documents 2 and 3 to realize the network topology reconstruction by controlling intelligent handover of mobile station in the overlapping area of multiple base stations, so as to achieve self-optimization, i.e. load balance concepts, but specific solution is not proposed. Besides, this kind of method has the defects of dependence on overlapping size and the MS number in the overlap area, and incapability of obtaining good load balance effect.

SUMMARY OF THE INVENTION

For the purpose of solving the problem in the prior arts of how to realize self-organization, especially self-optimization, in wireless relay communication network, a solution of reconstructing the topology according to the traffic related information of each cell is proposed in the present invention, so as to achieve self-optimization with balanced network load. The traffic related information of a includes the traffic related information applicable to the network topology reconstruction, or load related information as is named, including but not limited to a time-frequency resource related amount that is used by the traffic data in the c traffic throughout of each cell or the wireless channel quality of each transmitting the traffic data, etc.

Preferably, time-frequency resource related amount that is used by the traffic data in a cell includes but not limited to the time-frequency resource amount used by uplink and/or downlink traffic data of each cell, or the percent ratio of the time-frequency resource amount used by the uplink and/or downlink traffic data of each cell to all the time-frequency resource amount in that cell, or the weighed sum of the time-frequency resource amount used by all types of uplink and/or downlink traffic data of each cell, or the ratio of the weighed sum of the time-frequency resource amount used by all types of uplink and/or downlink traffic data of each cell to all the time-frequency resource amount in that cell, or a combination of any multiple items of the above, wherein the combination includes any combination mode advantageous for network topology reconstruction.

The network topology reconstruction manners include reconstructing network topology by means of relay station handover, or reconstructing network topology by means of a combination of relay station handover and mobile station handover, or reconstructing network topology by means of mobile station handover.

According to a first aspect of the invention, there is provided a method, in a management device in wireless relay communication network, for reconstructing the network topology of multiple cells in the domination of said management device, wherein, the network topology of said multiple cells is reconstructed according to a traffic related information of said multiple cells. Preferably, the method comprises the following steps: a. obtaining the traffic related information of each cell in said multiple cells respectively; b. judging Whether the traffic related information of at least one cell in said multiple cells satisfies a predefined condition; c. reconstructing the network topology, if the traffic related information of at least one cell in said multiple cells satisfies the predefined condition.

According to a second aspect of the invention, there provided a method, in base station of a wireless relay communication network, for aiding the management device to reconstruct the network topology, wherein, said method comprises steps of: A. obtaining traffic related information of the cell(s) in the domination of said base station; B. notifying said management device of said traffic related information.

According to a third aspect of the invention, there is provided a method in a handover controlling device of a wireless relay communication network, for aiding a management device to reconstruct the network topology, wherein, said method comprises steps of: i. receiving a handover notification from said management device to notify said handover controlling device to indicate at least one relay station or at least one relay station together with at least one mobile station in the domination of said handover controlling device to perform handover operation, said notification comprises the handover related information of the neighboring cell to which each relay station or mobile station is going to handover; ii. according to said handover notification, respectively notifying said at least one relay station or at least one relay station together with at least one mobile station to perform handover operation.

According to a fourth aspect of the invention, there is provided a method in a relay station of a wireless relay communication network, for aiding a management device to reconstruct the network topology, wherein, said method comprises steps of: I. receiving a handover notification from a management device or a handover controlling device to which said relay station belongs, said handover notification comprises the handover related information of the neighboring cell to which said relay station is going to handover; II. according to said handover notification, performing the handover operation.

According to a fifth aspect of the invention, there is provided a management apparatus in a management device wireless relay communication network, reconstructing the network topology of multiple cells in the domination of said management device, wherein, the network topology of said multiple cells is reconstructed according to a traffic related information of said multiple Preferably, the management apparatus comprises: a first obtaining means, for obtaining the traffic related information of each cell in said multiple cells respectively; a judging means, for judging whether the traffic related information of at least one cell in said multiple cells satisfies a predefined condition; a reconstructing means, for reconstructing the network topology, if the traffic related information of at least one cells in said multiple cells satisfies the predefined condition.

According to a six aspect of the invention, there is provided a first aiding apparatus in a base station of a wireless relay communication network, for aiding the management device to reconstruct the network topology, comprising: a second obtaining means, for obtaining traffic related information of the cell(s) in the domination of said base station; a second notifying means, for notifying said management device of said traffic related information.

According to a seventh aspect of the invention, there is provided a handover controlling apparatus, in a handover controlling device of a wireless relay communication network, for aiding a management device to reconstruct the network topology, comprising: a second receiving means, for receiving a handover notification from said management device to notify said handover controlling device to indicate at least one relay station or at least one relay station together with at least one mobile station in the domination of said handover controlling device to perform handover operation, said notification comprises the handover related information of the neighboring cell to which each relay station or mobile station is going to handover; a third notifying means, for according to said handover notification, respectively notifying said at least one relay station or said at least one relay station together with at least one mobile station to perform handover operation.

According to an eighth aspect of the invention, there is provided a second aiding apparatus in a relay station of a wireless relay communication network, for aiding a management device to reconstruct the network topology, comprising: a third receiving means, for receiving a handover notification from a management device or a handover controlling device to which said relay station belongs, said handover notification comprises the handover related information of the neighboring cell to which said relay station is going to be handed over; a handover means, for performing handover operation according to said handover notification.

The solutions in the present invention realize network topology reconstruction according to the traffic related information of multiple cells, so as to achieve load balance among multiple cells, therefore the network capacity and service quality could be effectively improved and the wireless relay communication network is applicable to those areas with unpredictable traffic distribution. And the network topology reconstruction function in the present invention can simplify the network planning and the network management, so that the network deployment cost and maintenance and management expenses could be saved.

BRIEF DESCRIPTION OF THE DRAWINGS

With reference to the following detailed description of the non-restrictive embodiments, other features, objects and advantages of the present invention will be more apparent.

Wherein, same or similar reference numerals refer to the same or similar steps or means (module).

DETAIL DESCRIPTION OF EMBODIMENTS

The detailed description of embodiments of the present invention will be given as below in conjunction with the drawings.

Figure 1:
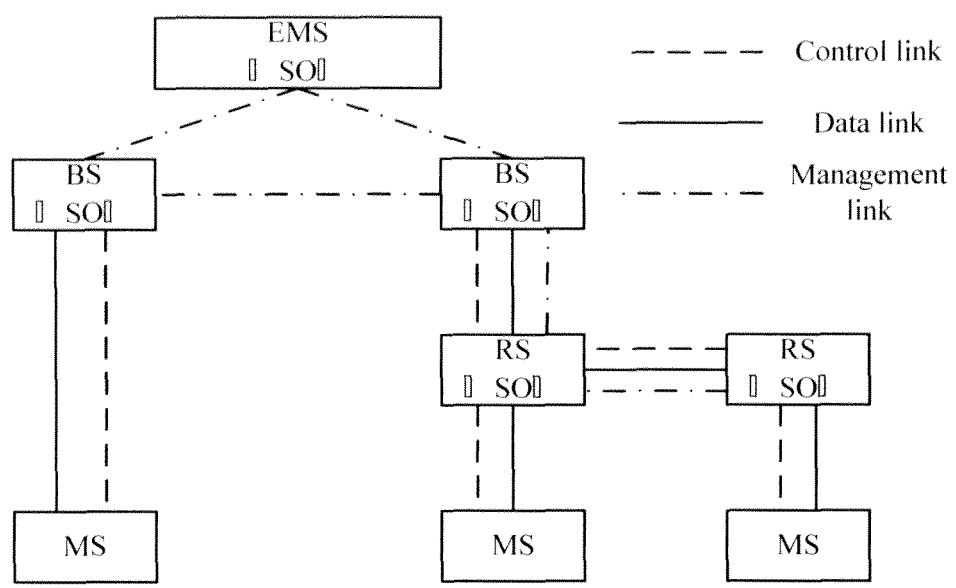
FIG. 1 shows a sketch map of the network self-organization structure of a WiMAX wireless multi-hop relay communication network according to an embodiment of the present invention.

Network topology reconstruction is one of the network self-organization functions. FIG. 1 shows a sketch map of the network self-organization structure of a WiMAX wireless multi-hop relay communication network according to an embodiment of the present invention. As illustrated in FIG. 1, the core function of the network topology reconstruction is performed by the management device in the Element Management System (EMS). The management device, the base station and the relay station are self-organization units of the network topology reconstruction. The management device could reconstruct the network topology periodically or aperiodically, wherein the time spacing is set by the network administrator. In some other wireless communication systems, such as 3G wireless relay communication network, there exists a Radio Network Controller (RNC) or a Base Station Controller (BSC) between the Element Management System and the base station. The EMS dominates at least one RNC or BSC, and each RNC or BSC dominates at least one base station.

The meaning of the network topology reconstruction is to change the affiliation between the relay station and the base station, or the affiliation between the mobile station and the base station or the relay station. Specifically, the network topology reconstruction could by realized by means of relay station handover, or a combination of relay station handover and mobile station handover, or only mobile station handover. Network topology reconstruction could be performed for the whole wireless relay communication network, or for part of the wireless relay communication network, which could be called as the reconstruction area. For the purpose of reducing the realization complexity, a large wireless relay communication network could be divided into multiple reconstruction areas.

Preferably, the traffic related information includes uplink traffic related information and/or downlink traffic related information, the management device could reconstruct the network topology according to the uplink traffic related information, or according to the downlink traffic related information, or according to a combination of uplink and downlink traffic related information.

In some wireless relay communication networks, the relay station could be classified into Active RS and Passive RS. The active RSs indicate those who can communicate with the base station or the relay station in a neighboring cell. The Passive RSs indicate those who are permanently dominated by a cell and can't communicate with the base station or the relay station in a neighboring cell or are deployed as not communicating with the base station or the relay station in a neighboring cell. In this disclosure, related relay stations all indicate active RSs, i.e. those who can participate in the network topology reconstruction, unless specific description of exception is given. In a wireless relay communication network, the management device reconstructs the network topology according to a traffic related information of each cell in its domination. The management device could also reconstruct the network topology based on the traffic related information of each cell in its domination in combination with the quality of wireless channel of each cell for transmitting the traffic data.

The detailed description will be given as below for the method, in a management device, for reconstructing the network topology according to the traffic related information of each cell in the domination of the management device.

Figure 2:
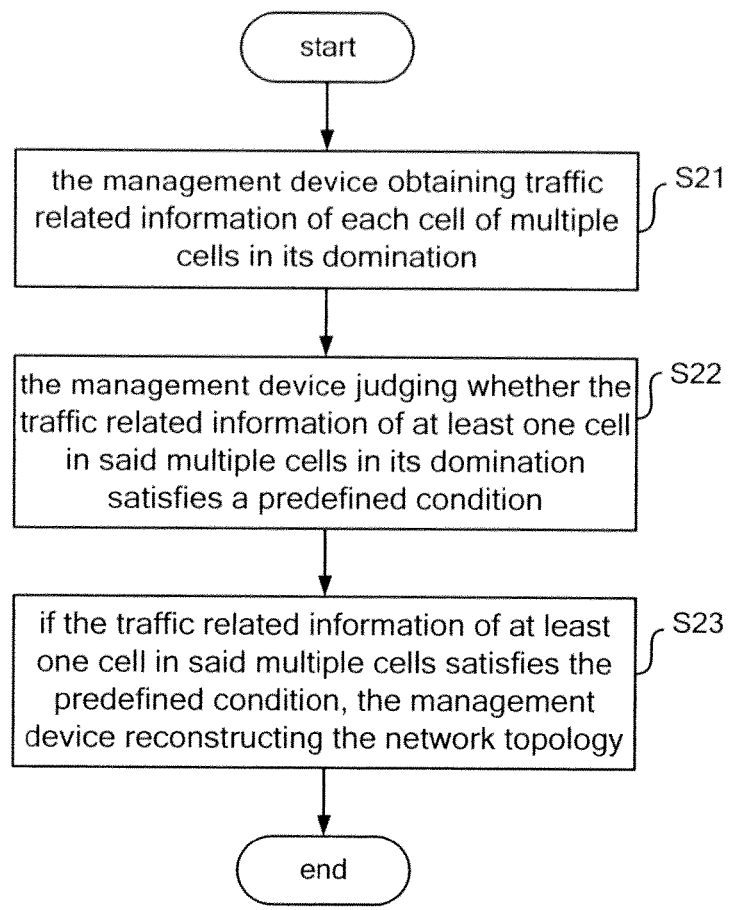
FIG. 2 shows the flowchart of a method, in a management device in wireless relay communication network, for reconstructing the network topology according to the traffic related information of each cell in its domination, according to an embodiment of the present invention.

FIG. 2 shows the flowchart of a method, in a management device in wireless relay communication network, for reconstructing the network topology according to the traffic related information of each cell in its domination, according to an embodiment of the present invention.

Firstly, in step S21, the management device obtains the traffic related information of each of multiple cells in the domination of the management device respectively.

The traffic related information of a cell includes the traffic related information applicable to the network topology reconstruction, or load related information as is named, including but not limited to a time-frequency resource related amount that used by the traffic data in the cell, traffic throughout each cell or the wireless channel quality of each cell for transmitting the traffic data, etc.

Preferably, time-frequency resource related amount that is used by traffic data in a cell includes but not limited to the time-frequency resource amount used by all types of uplink and/or downlink traffic data of each cell, or the percent ratio of the time-frequency resource amount used by all types of uplink and/or downlink traffic data of each cell to all the time-frequency resource amount in that cell, or the weighed sum of the time-frequency resource amount used by all types of uplink and/or downlink traffic data of each cell, or the ratio of the weighed sum of the frequency resource amount used by all types of uplink and/or downlink traffic data of each cell to all the time-frequency resource amount in that cell, or a combination of any multiple items of the above, wherein the combination includes any combination mode advantageous for network topology reconstruction. Preferably, the weighed sum of the time-frequency resource amount used by all types of uplink and/or downlink traffic data includes the sum of the time-frequency resource amount used by all types of uplink and/or downlink traffic data weighted according to the traffic type.

Specific description will be given for wireless relay communication network by taking the time-frequency resource amount used by all types of uplink and/or downlink traffic data of each cell as example of the traffic related information. The time-frequency resource amount used by all types of uplink and/or downlink traffic data of a cell includes the sum of a time-frequency resource amount used by the traffic data carried by the access link between a base station and a mobile station directly communicating with the base station, a time-frequency resource amount used by the traffic data carried by the relay link between a base station and a relay station, and a time-frequency resource amount used by the traffic data carried by the relay link between a relay station and another relay station, a time-frequency resource amount used by the traffic data carried by the access link between a relay station and a mobile station.

In the case that the allocation of the time-frequency resource is entirely controlled by the base station, preferably, the management device could directly obtain the traffic related information of each cell from the base station of each cell.

In the case that the base station allocates part of the time-frequency resource to a relay station for the relay station communicating with other relay stations or mobile stations dominated by the base station, and the relay station allocates said part of time-frequency resource by itself, the management device could also obtain the traffic related information used by each relay station from each relay station, or each relay station reports its traffic related information to the base station and the base station reports all to the management device. Of course, in this case, the base station could also calculate the time-frequency resource amount used by the relay station and accordingly determine the traffic related information, according to the traffic data amount between a relay station and other relay station or mobile station dominated by the relay station and the adopted modulation and coding manner thereof, therefore the relay station needs not to report the traffic related information.

Subsequently, in step S22, the management device judges whether the traffic related information of at least one cell in multiple cells in its domination satisfies a predefined condition.

Preferably, by taking example for a time-frequency resource related amount that is used by the traffic data in said cell in a predefined time duration using as the traffic related information, the predefined condition comprises whether the time-frequency resource related amount of each cell exceeds a first predefined threshold.

Lastly, is step S23, if the traffic related information of at least one cell in multiple cells in the domination of the management device satisfies the predefined condition, the management device reconstructs the network topology. A preferable flowchart of the management device reconstructing the network topology is shown in FIG. 3.

Firstly, in step S31, if the traffic related information of at least one cell in said multiple cells in the domination of the management device satisfies the predefined condition, the management device determines to hand over at least one relay station or at least one relay station together with at least one mobile station in each of said at least one cell said multiple cells to a neighboring cell.

Subsequently, in step S32, the management device notifies respectively at least one relay station or at least one relay station together with at least one mobile station in each of said at least one cell to perform handover operation, or notifies the base station of each of said at least one cell to indicate at least one relay station or at least one relay station together with at least one mobile station in the domination of the base station to perform handover operation, wherein, each notification comprises the handover related information of the neighboring cell to which each relay station or mobile station is going to be handed over.

Figure 3:
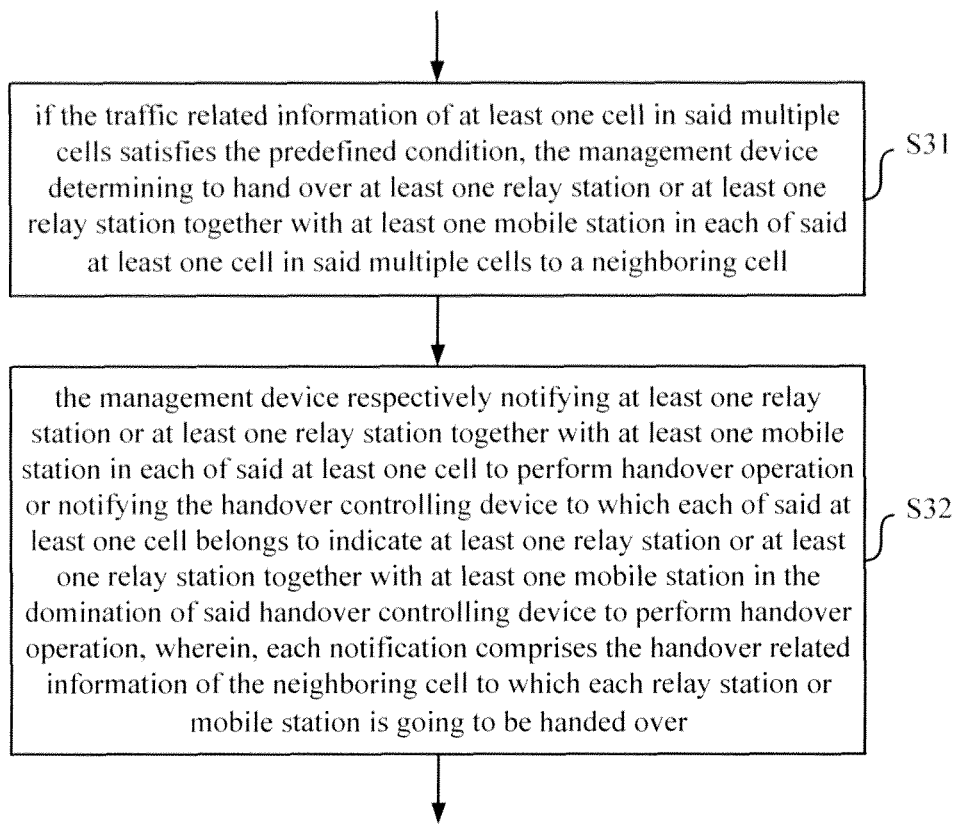
FIG. 3 shows a flowchart of preferable substeps of step S23 as illustrated in FIG. 2.
Figure 4:
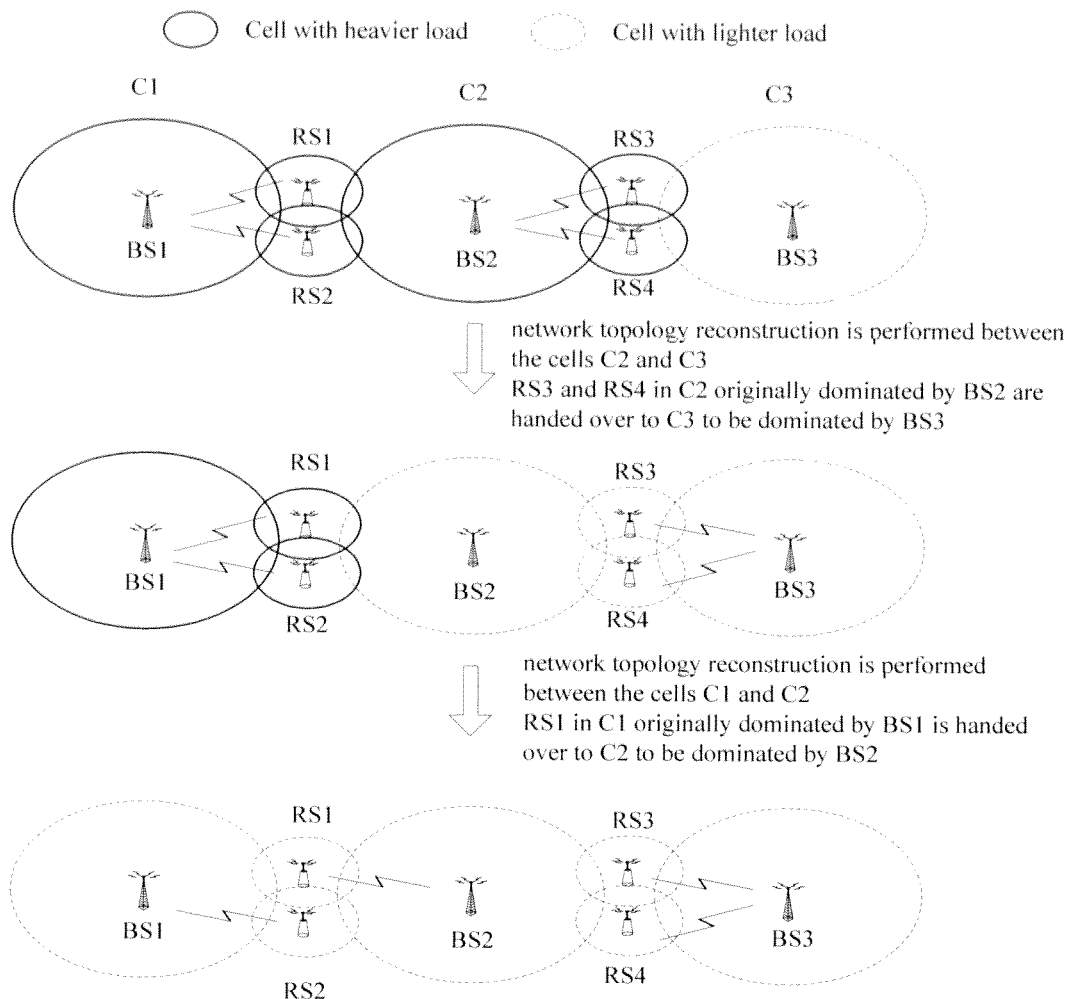
FIG. 4 shows a sketch map of network topology reconstruction according to an embodiment of the present invention.

The detailed description of the flowcharts as shown in FIG. 2 and FIG. 3 will be given as below in conjunction with the sketch map of the network topology reconstruction as shown in FIG. 4 for better understanding.

For conciseness, three cells are shown in FIG. 4, in the original network deployment, the relay station RS1 and RS2 locate in the cell C1, and are dominated by the base station BS1. The relay station RS3 and RS4 locate in the cell C2, and are dominated by the base station BS2. Besides, there are one or more mobile stations in each cell (not shown in FIG. 4).

Firstly, the management device obtains traffic related information of the cells C1, C2 and C3 from the base stations BS1, BS2 and BS3. By taking example for a time-frequency resource related amount that is used by the traffic data in each cell in a predefined time duration using as traffic related information, for the first time of network topology reconstruction, the predefined time duration could be the time spacing between the network startup and the startup of the first time of the network topology reconstruction, for the subsequent network topology reconstruction, the predefined time duration could be the time spacing between the success of the last network topology reconstruction and the startup of the current network topology reconstruction, or the predefined time duration could be set by the network administrator at will.

Without loss of generality, it is taken as an example that an available time-frequency resource amount for all in a predefined time duration in FIG. 4 is 100, and the time-frequency resource related amount used by the traffic data of the cell C1 in the predefined time duration is 70, and the time-frequency resource related amount used by the traffic data of the cell C2 in the predefined time duration is 65, and the time-frequency resource related amount used by the traffic data of the cell C3 in the predefined time duration is 10, and the first predefined threshold is 60. Since the time-frequency resource related amount used by the traffic data of the cells C1 and C2 exceed the first predefined threshold and the time-frequency resource related amount used by the traffic data of the cells C3 is less than the first predefined threshold, it could be regarded that the cells C1 and C2 are of heavier load and the cell C3 is of lighter load. Therefore, the management device determines that the network topology consisting of the cells C1, C2 and C3 needs reconstruction to balance the load of the cells C1, C2 and C3, according to the first predefined threshold and the information of the time-frequency resource related amount used by the traffic data of each cell.

As shown in FIG. 4, the cells C1 and C2 are neighbors and are both of heavier load. In order to relieve the load of the cell C1, one or two of the relay stations RS1 and RS2 dominated by the cell C1 need(s) to be handed over to the neighboring cell C2. But the cell C2 is of heavier load too, therefore, the management device could determine firstly to hand over the relay stations RS3 and RS4 to the cell C3 so that they are dominated by the base station BS3; subsequently to hand over the relay stations RS1 and RS2 in the cell C1 to the cell C2 so that they are dominated by the base station BS2. Accordingly, the load of the cells C1, C2 and C3 are balanced.

After determining to hand over the relay stations RS3 and RS4 to the cell C3, the management device sends a handover notifications (via the base station BS2) to the relay stations RS3 and RS4 that are to be handed over respectively, wherein each notification comprises the handover related information of the neighboring cell C3 to which the relay stations to be handed over are gonging to be handed over. Preferably, the handover related information comprises an identifier of the cell C3 to which the relay stations RS3 and RS4 are going to be handed over, or a synchronization code identifier of the cell C3, or a synchronization code of the cell C3, or a frequency information of the carrier of the cell C3.

Or the management device sends a handover notification to the base station BS2, wherein the notification comprises the handover related information of the neighboring cell C3 to which the relay stations RS3 and RS4 are gonging to be handed over.

Subsequently, according to the handover notification from the management device, the base station BS2 notifies the relay stations RS3 and RS4 to perform handover operation respectively.

In some wireless relay communication networks, there exists a radio network controlling device or a base station controlling device between the base station and the management device, the handover of the relay stations RS3 or RS4 is controlled by the radio network controlling device or the base station controlling device, the management device could also send the handover notification to the radio network controlling device or the base station controlling device, and then the radio network controlling device or the base station controlling device sends the handover notification (via the base station BS2) to the relay stations RS3 and RS4 that are to be handed over.

After receiving the handover notification from the management device or the network controlling device or the base station controlling device or the base station, the relay station RS3 performs handover operation according to the handover related information of the neighboring cell C3, to which the relay station RS3 is going to be handed over, contained in the handover notification.

There could be no handover for those mobile stations dominated by the relay stations RS3 and RS4, namely the handover of the relay stations RS3 and RS4 is transparent to their dominated mobile stations. The handover of the relay stations RS3 and RS4 is the same as the handover of mobile station in prior art, with details referring to IEEE 802.16d/e protocols or 3GPP protocols related to handover, such as 3GPP TS 25.331 and 3GPP TS 25.922. therefore unnecessary details won't be given in this disclosure.

Before the relay stations RS3 and RS4 performing the handover operation, their dominated mobile stations could also perform handover operation. The mobiles stations could be handed over to other relay stations or base stations in advance, and then be handed over back to the relay stations RS3 and RS4 after the relay stations RS3 and RS4 finishing the handover.

Specifically, the mobile stations dominated by the relay stations RS3 and RS4 have two handover manners, i.e. active handover and passive handover.

The active handover of mobile station indicates that, after receiving the handover notification, the relay stations RS3 and RS4 firstly reduce the transmitting power below a second predefined threshold, so that mobile station(s) in the domination of the relay stations RS3 and RS4 is(are) handed over to the domination of other base station or relay station. After finishing the handover, namely being handed over from the base station BS2 to BS3, the relay stations RS3 and RS4 increase the transmitting power over a third predefined threshold, so that their originally dominated mobile station(s) could be handed over back. Of course, taking the mobility of mobile station into account, for the relay stations RS3 or RS4, those mobile stations handed over outwards are not always the same as those mobile stations handed over back.

The passive handover of the mobile station indicates that, before notifying the relay stations RS3 and RS4 to perform handover operation, the management device or the handover controlling device notifies the mobile station(s) in the domination of the relay stations RS3 and RS4 to perform handover operation in advance. And then, after receiving handover done notifications from the relay station RS3 or RS4, the management device or the handover controlling device notifies those mobile station(s) handed over outwards to be handed over back to the domination of the relay station RS3 or RS4. Of course, taking the mobility of mobile station into account, for the relay stations RS3 or RS4, those mobile stations handed over outwards are not always the same as those mobile stations handed over back.

It should be indicated that, herein the handover controlling device comprises the dominating base station of the relay station RS3 and RS4, or their dominating wire network controlling device or base station controlling device.

Figure 5:
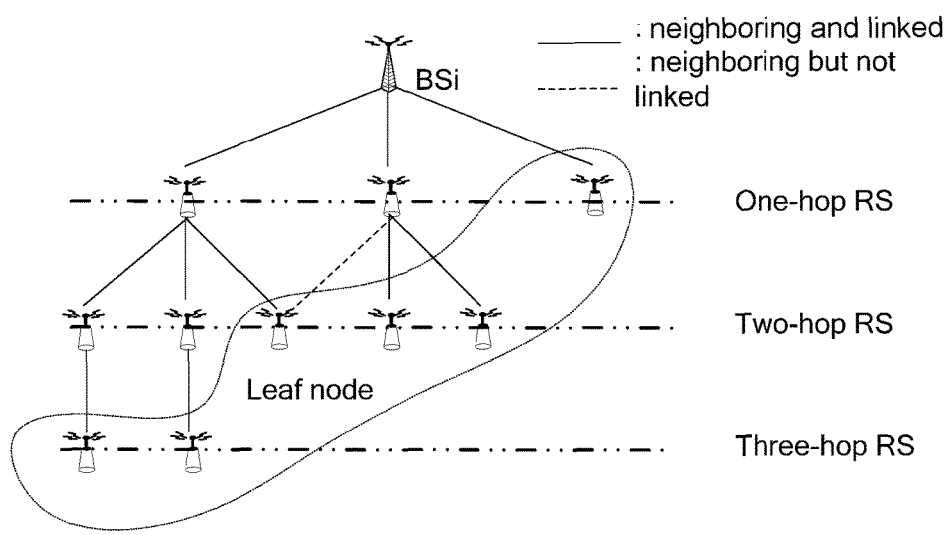
FIG. 5 shows a sketch map of the network topology tree with base station BSi as root node according to an embodiment of the present invention.

In a multi-hop relay communication network, the relay stations in a cell could be classified into an intermediate relay station and an edge relay station. As shown in FIG. 5, in the network topology tree with the base station BSi as the root node, the leaf node is the edge relay station, and the middle node is the intermediate relay station. Generally, the leaf node locates in the edge of a cell or the cross border of two cells. Preferably, the management device will determine to hand over one or more edge relay station in the cell(s) with heavier load to the neighboring cell.

Preferably, the network topology reconstruction scheme in the step S31 as shown in FIG. 3 could adopt the distributed optimization manner, namely a network topology reconstruction consisting of multiple local reconstructions, wherein a local reconstruction indicates the network topology reconstruction in a local network consisting of a cell with its traffic related information satisfying the predetermined condition and its neighboring cell(s).

By taking the time-frequency resource amount used by the traffic data of a cell in a predetermined time duration as an example of the traffic related information of the cell, if the time-frequency resource related amount used by the traffic data of a cell exceeds the first predefined threshold, the cell could be regarded as a cell of heavier load, if the time-frequency resource related amount used by the traffic data of a cell doesn't exceed (i.e. less than or equal to) the first predefined threshold, the cell could be regarded as a cell of lighter load. For a cell with heavier load, a local reconstruction among the cell with heavier load and its neighboring cell(s) with lighter load could be performed so as to balance their load. If there are multiple cells with heavier load, the local reconstruction will be performed many times to realize the network topology reconstruction.

Figure 6:
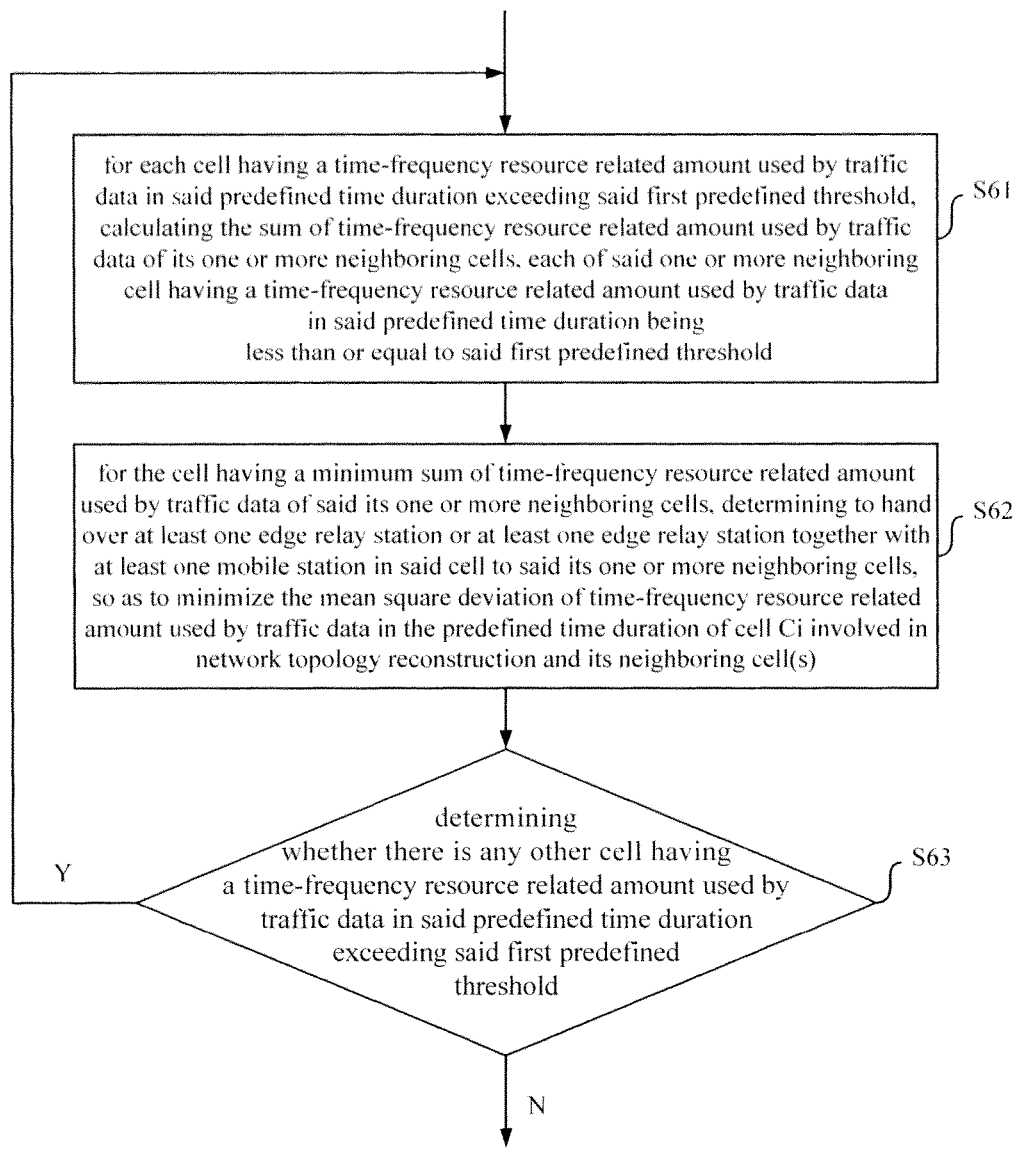
FIG. 6 shows a flowchart of preferable substeps of step S31 as illustrated in FIG. 3.

For step S31 as shown in FIG. 3, a preferable substep flowchart of realizing the network topology reconstruction by multiple local reconstructions is shown in FIG. 6.

Firstly, in the step S61, for each of one or more cell having a time-frequency resource related amount used by the traffic data in the predefined time duration exceeding the first predefined threshold, the management device calculates the sum of time-frequency resource related amount used by the traffic data of its one or more neighboring cells in said predefined time duration, each of said one or more neighboring cell having a time-frequency resource related amount used by the traffic data in said predefined time duration not exceeding said first predefined threshold.

Subsequently, in the step S62, for the cell Ci having a minimum sum of the time-frequency resource related amount used by the traffic data of its said one or more neighboring cells having a time-frequency resource related amount used by the traffic data in the predefined time duration being less than or equal to said first predefined threshold, the management device determines to hand over at least one edge relay station or at least one edge relay station together with at least one mobile station in said cell Ci to its said one or more neighboring cells, so as to minimize $$\sum_{Cell_j \in S} (NBL_j - BL_m)^2,$$

namely to minimize the mean square deviation of the time-frequency resource related amount used by the traffic data in the predefined time duration of cell Ci involved in the network topology reconstruction and its neighboring cell(s); wherein, S is the set that comprises cell Ci and its at least one neighboring cells having a time-frequency resource related amount used by the traffic data in the predefined time duration being less than or equal to said first predefined threshold; $NBL_j$ is, in the case that at least one edge relay station or at least one edge relay station together with at least one mobile station in cell Ci have been handed over from cell Ci to neighboring cell(s), the time-frequency resource related amount used, in said predefined time duration, by the traffic data of cell j in a set S recalculated under the network topology; $BL_m$ is the mean value of the time-frequency resource related amount used, in said predefined time duration, by the traffic data of all cells in set S.

Subsequently, in the step S63, the management device determines whether there is any other cell having a time-frequency resource related amount used by the traffic data in said predefined time duration exceeding said first predefined threshold, if any, the management device repeatedly executes steps S61 and S62, if none, the current network topology construction is finished.

The detailed description of the flowchart shown in FIG. 6 will be given as below, based on the neighbor relationship and domination relationship between the base station and the relay station, by taking only the edge relay station participating in the network topology reconstruction as example. For convenience of describing the neighbor relationship and domination relationship between the base station and the relay station, herein several basic matrixes applicable to common wireless relay communication network are defined as below.

1. neighbor relationship between relay stations matrix RRA $$RRA = \begin{array}{c} \\ RS1 \\ RS2 \\ RS3 \\ \ldots \\ RSn \end{array} \begin{bmatrix} RS1 & RS2 & RS3 & \cdots & RSn \\ 0 & RRA_{1,2} & RRA_{1,3} & \cdots & RRA_{1,n} \\ RRA_{2,1} & 0 & RRA_{2,3} & \cdots & RRA_{2,n} \\ RRA_{3,1} & RRA_{3,2} & 0 & \cdots & RRA_{3,n} \\ \ldots & \ldots & \ldots & \ldots & \ldots \\ RRA_{n,1} & RRA_{n,2} & RRA_{n,3} & \cdots & 0 \end{bmatrix}$$

Matrix RRA represents the neighbor relationship between any two relay stations in the network involved in network topology reconstruction, wherein two relay stations neighboring on each other means they could directly communicate with each other, and a relay station may have one or more neighboring relay station, and n denotes the amount of the relay stations in the network. $RRA_{i,j}=1$ denotes the relay stations RSi and RSj are neighboring on each other, and $RRA_{i,j}=0$ denotes the relay stations RSi and RSj are not neighboring on each other, wherein i, j=1, . . . , n.

2. neighbor relationship between the base station and the relay station matrix BRA $$BRA = \begin{array}{c} \\ BS1 \\ BS2 \\ BS3 \\ \ldots \\ BSm \end{array} \begin{bmatrix} RS1 & RS2 & RS3 & \cdots & RSn \\ BRA_{1,1} & BRA_{1,2} & BRA_{1,3} & \cdots & BRA_{1,n} \\ BRA_{2,1} & BRA_{2,2} & BRA_{2,3} & \cdots & BRA_{2,n} \\ BRA_{3,1} & BRA_{3,2} & BRA_{3,3} & \cdots & BRA_{3,n} \\ \ldots & \ldots & \ldots & \ldots & \ldots \\ BRA_{m,1} & BRA_{m,2} & BRA_{m,3} & \cdots & BRA_{m,n} \end{bmatrix}$$

Matrix BRA represents neighbor relationship between any relay station and any base station in the network involved in the network topology reconstruction, wherein the relay station and the base station neighboring on each other means they could directly communicate with each other, and a relay station may have one or more neighboring base stations, and n denotes the amount of the relay stations in the network, and m denotes the amount of the base stations in the network. $BRA_{i,j}=1$ denotes the base station BSi and the relay station RSj are neighboring on each other, and $BRA_{i,j}=0$ denotes the base station BSi and the relay station RSj are not neighboring on each other, wherein i=1, . . . , m and j=1, . . . , n.

In the case that a wireless relay communication network is deployed, RRA and BRA are generally invariable.

3. domination relationship between the base station and the relay station matrix BRB $$BRB = \begin{array}{c} \\ BS1 \\ BS2 \\ BS3 \\ \ldots \\ BSm \end{array} \begin{bmatrix} RS1 & RS2 & RS3 & \cdots & RSn \\ BRB_{1,1} & BRB_{1,2} & BRB_{1,3} & \cdots & BRB_{1,n} \\ BRB_{2,1} & BRB_{2,2} & BRB_{2,3} & \cdots & BRB_{2,n} \\ BRB_{3,1} & BRB_{3,2} & BRB_{3,3} & \cdots & BRB_{3,n} \\ \ldots & \ldots & \ldots & \ldots & \ldots \\ BRB_{m,1} & BRB_{m,2} & BRB_{m,3} & \cdots & BRB_{m,n} \end{bmatrix}$$

Matrix BRB represents the domination relationship between any relay station and any base station in the network involved in network topology reconstruction, wherein n denotes the amount of the relay stations in the network, and m denotes the amount of the base stations in the network. $BRB_{i,j}=1$ denotes that the relay station RSj belongs to the cell Ci dominated by the base station BSi, and $BRB_{i,j}=1$ denotes that the relay station RSj doesn't belong to the cell Ci dominated by the base station BSi, wherein i=1, . . . , m and j=1, . . . , n.

Generally, in the case that a wireless relay communication network is deployed, RRA and BRA are invariable without consideration of malfunction of the base station and the relay station. If any relay station or base station is in trouble, RRA and BRA need to be updated, for example by the network administrator.

BRB varies with the reconstruction of the network topology. The network administrator may set an original BRB for the network initialization. After the startup of the network, the management device could reconstruct the network topology according to traffic related information of each cell in the network, so as to update BRB.

Figure 7:
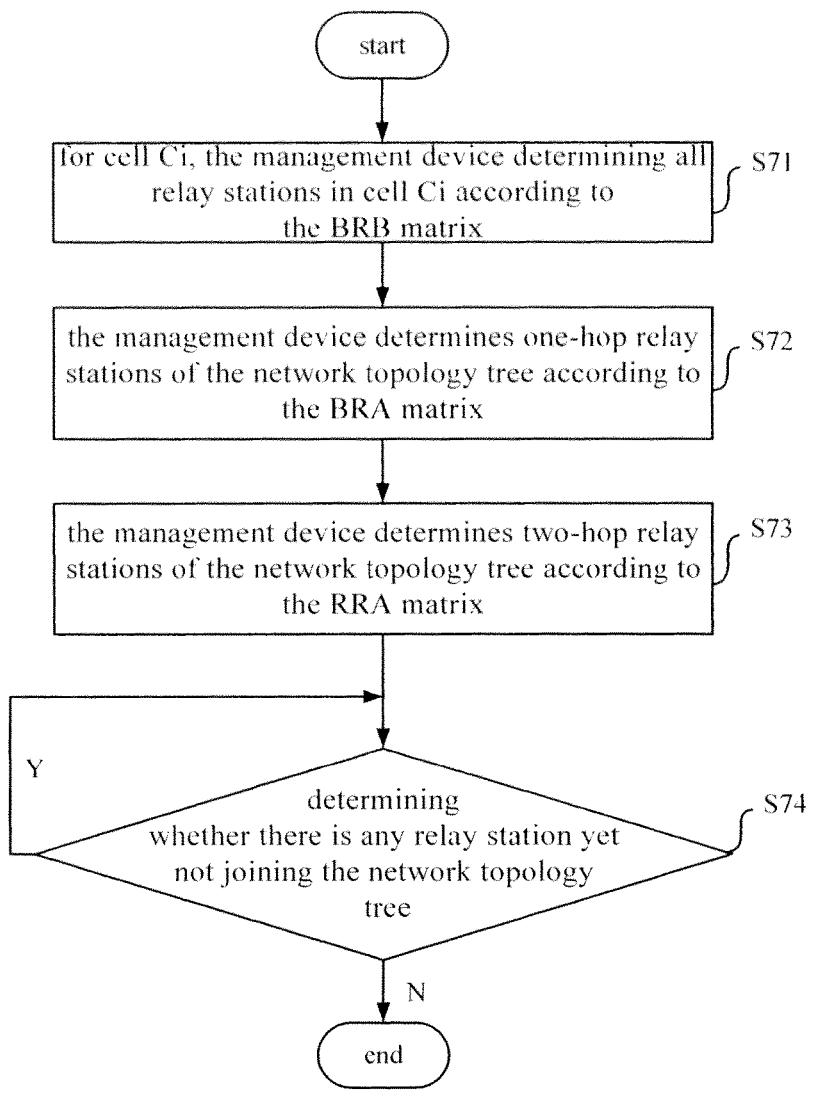
FIG. 7 shows a flowchart of constructing the network topology tree for each cell according to an embodiment of the present invention.

The management device could identify the topology between cells and the topology inside a cell with the help of the above three matrixes. BRB matrix represents the members of each cell. RRA and BRA matrix represent routing information. Based on the three matrixes, it is easy for the management device to establish the network topology tree for each cell, within which the root node is the base station, whereas the middle node and leaf node are relay stations in the cell. A branch is the link between two neighboring nodes determined according to BRA and RRA. FIG. 7 shows a flowchart of a method of constructing the network topology tree for each cell. The method enables each relay station to achieve the least hops when communicating with the base station.

Firstly, in the step S71, for cell Ci, the management device determines all the relay stations in the cell Ci according to the BRB matrix, i.e. RS∈ {RS: $BRB_{i,j}=1$, j=1, 2, . . . , n}, wherein the base station BSi is the root node of the network topology tree of the cell Ci.

Subsequently, in the step S72, the management device determines one-hop relay stations of the network topology tree according to the BRA matrix, i.e. RS∈ {RS: $BRA_{i,j}=1$ and $BRB_{i,j}=1$, j=1, 2, . . . , n}.

In the step S73, for each one-hop relay station RSj, the management device determines their dependent relay stations, i.e. those relay stations neighboring on RSj and belonging to the cell Ci and not being one-hop relay stations, i.e. RS∈ {RS: $RRA_{j,k}=1$ and $BRB_{i,k}=1$, j,k=1, 2, . . . , n} and RS∈ {RS: $BRA_{i,k}=1$ and $BRB_{i,k}=1$, j=1, 2 . . . , n}. All the dependent relay stations of the one-hop relay station RSj constitute two-hop relay stations of the network topology tree. If a relay station is dependent to several one-hop relay stations, the management device will choose a one-hop relay station for the relay station.

In the step S74, the management device determines whether there is any relay station not joining the network topology tree yet, if any, the management device repeats the step S73 until all relay stations in the cell Ci join the network topology tree.

The sketch map of a network topology tree generated according to the method as shown in FIG. 7 is shown in FIG. 5. Thus, for cell m, it is easy for the management device to determine which relay station(s) is(are) edge relay station according to the generated network topology tree, namely to determine the edge relay station set. In the case that an edge relay station is determined to be handed over to its neighbor cell, it is easy to determine which relay station and/or base station is neighboring on the edge relay station according to RRA matrix and BRA matrix, so as to determine which neighbor cell(s) the edge relay station could be handed over to.

For example, for the edge relay station i in a cell with heavier load, the management device determines the relay stations and/or the base stations that are neighboring on the edge relay station RSi based on the RRA matrix and the BRA matrix, i.e. RS∈ {RS: $RRA_{i,j}=1$, and RSj ∈ relay stations in the neighbor cell with lighter load} ∪ {$BRA_{p,i}=1$, BSp ∈ base stations in the neighbor cc 11 with lighter load}, so as to accordingly determine the target cell to which the edge relay station RSi is going to be handed over.

Specifically, in the case that it is determined to hand over one or more edge relay stations in a cell with heavier load to a neighbor cell, the calculation of $NBL_j$ will be described in detail according to minimum $$\sum_{Cell_j \in S} (NBL_j - BL_m)^2$$

criterion. $NBL_j$ is, in the case that at least one edge relay station or at least one edge relay station together with at least one mobile station in cell Ci have been handed over from cell Ci to neighboring cell(s), the time-frequency resource related amount may be used, in said predefined time duration, by the traffic data of cell j in a set S recalculated under the network topology.

Specifically, taking the network topology as shown in FIG. 4 as example, in said predefined time duration, time-frequency resource related amount used by the traffic data of cell C1 is 70, and time-frequency resource related amount used by the traffic data of cell C2 is 65, and time-frequency resource related amount used by the traffic data of cell C3 is 10.

For cell C2, time-frequency resource related amount used by its traffic data is 65, wherein the time-frequency resource related amount used by communication between the relay station RS3 and its dominated mobile station(s) is 15, the time-frequency resource related amount used by the communication between the relay station RS4 and its dominated mobile station(s) is 10, the time-frequency resource related amount used by the base station BS2 is 40. The time-frequency resource related amount of 40 used by the base station BS2 comprises, in specific, the time-frequency resource related amount 20 used by the direct communication between the base station BS2 and other mobile stations, the time-frequency resource related amount 12 used by the communication between the base station BS2 and the relay station RS3, the e-frequency resource related amount 8 used by the communication between the base station BS2 and the relay station RS4.

If the relay stations RS3 and RS4 are handed over to cell C3, then after the handover, the time-frequency resource related amount $NBL_2$ used by cell C2 reduces to the time-frequency resource related amount 20 used by the direct communication between the base station BS2 and other mobile stations. The time-frequency resource related amount $NBL_3$ used by cell C3 increases to the sum of the time-frequency resource related amount 10 originally used by cell C3, the time-frequency resource related amount 15 used by the communication between the relay station RS3 and its dominated mobile station(s), the time-frequency resource related amount 10 used by communication between the relay station RS4 and its dominated mobile station(s), the time-frequency resource related amount used by the communication between the base station BS3 and the relay station RS3, the time-frequency resource related amount used by the communication between the base station BS3 and the relay station RS4. Wherein the time-frequency resource related amount used by the communication between the base station BS3 and the relay stations RS3 and RS4 depends on the modulation and coding manner decided based on the channel quality thereof. The management device could determine the needed time-frequency resource related amount according to the modulation and coding manner decided based on the channel quality thereof and traffic data amount. Of course, the management device could also determine an estimated value referring to the time-frequency resource related amount used by the communication between the base station BS2 and the relay stations RS3 and RS4.

The network topology shown in FIG. 4 only involves one-hop relay stations. In the case that a multi-hop relay station is involved, the time-frequency resource related amount used by the link between the relay stations should also be taken into account.

In the case that the network topology reconstruction is realized by a combination of the relay station handover and the mobile station handover, the calculation of $NBL_j$ is also simple. For a cell to which a mobile station is going to be handed over, the time-frequency resource related amount which may be used by the communication between the mobile station(s) and the base station or relay station in the cell should be added. For a cell from which a mobile station is going to be handed over, the time-frequency resource related amount used by the communication between the mobile station(s) and the base station or relay station in the cell should be deleted.

It needs to be indicated that, the time-frequency resource related amount in the above context could only be the time-frequency resource related amount used by the uplink traffic data, also could only be the time-frequency resource related amount used by the downlink traffic data, also could be the sum of time-frequency resource related amount used by the uplink and downlink traffic data.

The above algorithm of $NBL_j$ is a relatively precise algorithm taking the time-frequency resource related amount used by the relay links between the base station and the relay station and between the relay stations into account. A simplified method of calculating the time-frequency resource related amount used by the traffic data in the predefined time duration of cell Ci is only considering the time-frequency resource related amount used by the access link without a consideration of the time-frequency resource related amount used by relay link. Thus the calculation of $NBL_j$ is much simpler. Detailed description for this will be given as below.

Herein, four vectors are defined, i.e. DRL, URL, DBL, and UBL, wherein DRL denotes the downlink time-frequency resource related amount used by the communication between each relay station and its dominated mobile station(s), and URL denotes the uplink time-frequency resource related amount used by the communication between each relay station and its dominated mobile station(s), and DBL denotes the sum of the downlink time-frequency resource related amount used by the direct communication between each base station and its dominated mobile station(s) and DRL of its each dominated relay station and, and UBL denotes the sum of the downlink time-frequency resource related amount used by the direct communication between a base station and its dominated mobile station(s) and URL of its each dominated relay station. Wherein DBL and UBL could also include the time-frequency resource related amount used by the communication between a base station and those relay stations not involved in the network topology reconstruction, and the time-frequency resource related amount used by the communication between those relay stations not involved in the network topology reconstruction and their dominated mobile station(s).

RS1 RS2 RS3 . . . RSn
DRL=(DRL$_1$ DRL$_2$ DRL$_3$ . . . DRL$_n$)
RS1 RS2 RS3 . . . RSn
URL=(URL$_1$ URL$_2$ URL$_3$ . . . . URL$_n$)
BS1 BS2 BS3 . . . BSm
DBL=(DBL$_1$ DBL$_2$ DBL$_3$ . . . DBL$_m$)
BS1 BS2 BS3 . . . BSm
UBL=(UBL$_1$ UBL$_2$ UBL$_3$ . . . UBL$_m$)

Wherein, m is the amount of the base station, n is the amount of the relay station. Taking the network topology reconstruction realized only by the relay station handover as example, the calculation of UBL and DBL for each cell could be realized with the help of the following formulas:

$$DBL=DBL0+DRL \times BRB^T$$

$$UBL=UBL0+URL \times BRB^T$$

Wherein, DBL0 and UBL0 denote downlink and uplink time-frequency resource related amount used by the direct communication between each base station and its dominated mobile station(s), and the downlink and uplink time-frequency resource related amount used by the communication between the base station and those relay station(s) not involved in the network topology reconstruction, and the downlink and uplink time-frequency resource related amount used by the communication between those relay station(s) not involved in the network topology reconstruction and its(their dominated mobile station(s). DBL0 and UBL0 are not affected by the network topology reconstruction.

Figure 8:
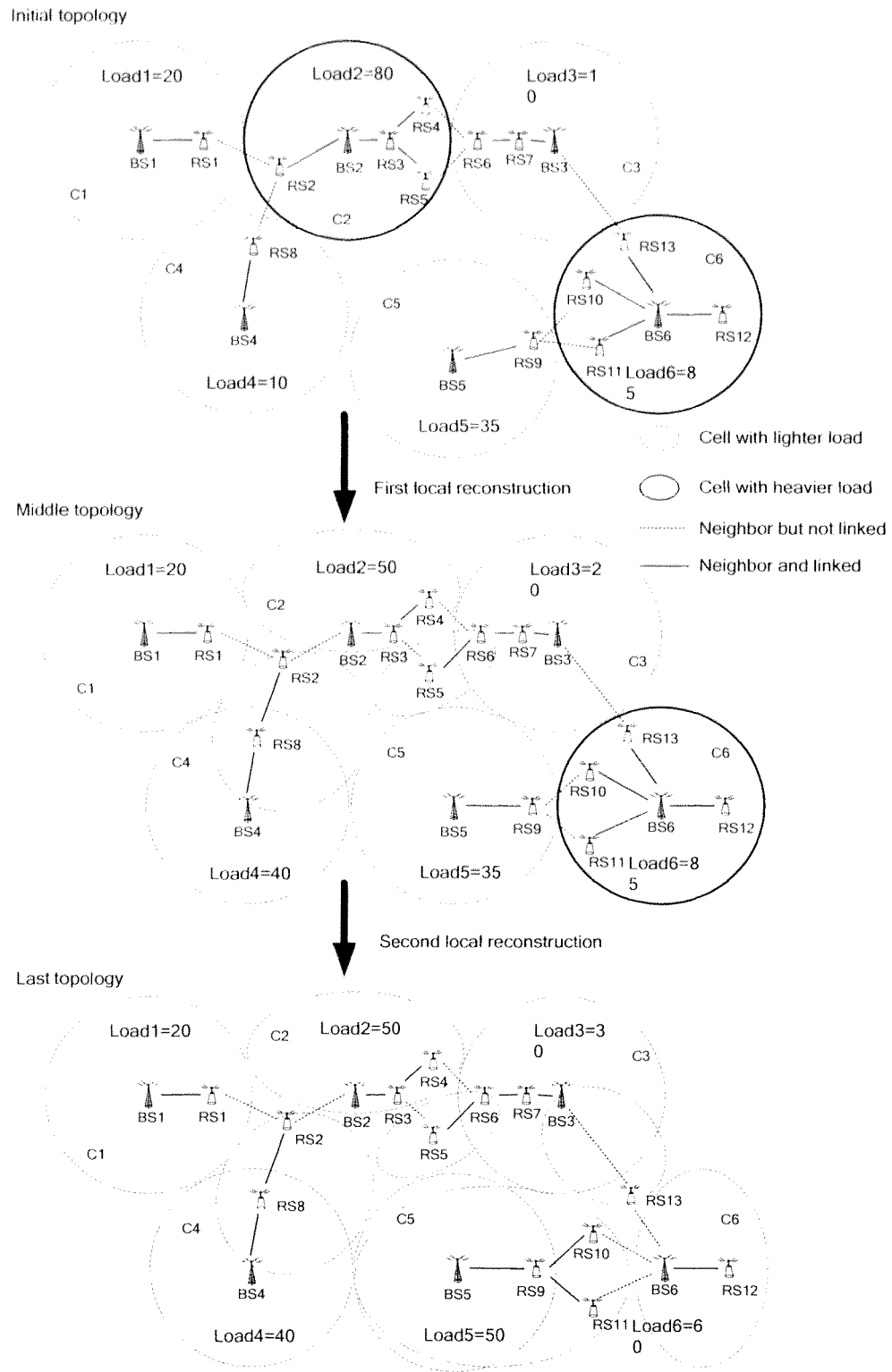
FIG. 8 shows a sketch map of the network topology reconstruction according to an embodiment of the present invention.

Detailed description of the flowchart as shown in FIG. 6 will be given as below in conjunction with the network topology reconstruction procedure as shown in FIG. 8.

There are six cells in the network topology as shown in FIG. 8. In the cell C1, the base station BS1 dominates the relay station RS1. In the cell C2, the base station BS2 dominates the relay stations RS2, RS3, RS4 and RS5, wherein the relay stations RS2 and RS3 are one-hop relay stations, and the relay stations RS4 and RS5 are two-hop relay stations dominated by the relay station RS2. In the cell C3, the base station BS1 dominates the relay stations RS6 and RS7, wherein the relay station RS6 is an one-hop relay station, and the relay station RS7 is a two-hop relay station dominated by the relay station RS6. In the cell C4, the base station BS4 dominates the relay station RS8, In the cell C5, the base station BS5 dominates the relay station RS9. In the cell C6, the base station BS6 dominates the relay stations RS10, RS11, RS12 and RS13, which are all one-hop relay stations.

The time-frequency resource related amount used by the traffic data in the predefined time duration (hereinafter referred to as "load" for short) of the cells C1 to C6 are shown in FIG. 8, respectively. The load of the cell C1 is Load1=20. The load of the cell C2 is Load2=80. The load of the cell C3 is Load3=10. The load of the cell C4 is Load4=10. The load of the cell C5 is Load5=35. The load of the cell C6 is Load6=85. In the case that the first predefined threshold is 70, the cells C2 and C6 are cells with heavier load.

The management device firstly calculates the sums of the load of the neighboring cells with lighter load of the cells C2 and C6, i.e. ALC2 and ALC6, respectively. For the cell C2, ALC2=Load1+Load3+Load4=40; for the cell C6, ALC6=Load3+Load5=45. Since ALC2 is less than ALC6, the management device chooses the cell C2 and its neighboring cells C1, C3 and C4 with lighter load to perform the first local reconstruction. According to the above, the management device determines the edge relay station set of the cell C2, i.e. the relay stations RS2, RS4 and RS5. And then, the management device determines possible handover target cell(s) to which each relay station may be handed over, based on the BRA, RRA and BRB. For the relay station RS2, its possible handover target cell comprises the cell C1 and the cell C4; for the relay station RS4, its possible handover target cell is the cell C3; for the relay station RS5, its possible handover target cell is the cell C3.

The management device could determine the first local reconstruction scheme between the cell C2 and its neighboring cells C1, C3 and C4 with lighter load, according to enumeration arithmetic or gene arithmetic or other arithmetic, based on the above minimum $$\sum_{Cell_j \in S} (NBL_j - BL_m)^2$$

criterion. Without loss of generality, taking that the management device determines to hand over the relay station RS2 to the cell C4 and to hand over the y RS5 to the cell C3 as example, i.e. the first local reconstruction scheme is determined, and the updated load distribution of each cell is shown in FIG. 8, wherein the load of the cell C1 is Load1=20, and the load of the cell C2 is Load2=50, and the load of the cell C3 is Load3=20, and the load of the cell C4 is Load4=40, and the load of the cell C5 is Load5=35, and the load of the cell C6 is Load6=85. In this case, only the cell. C6 is of heavier load, then the management device will choose the cell C6 and its neighboring C3 and C5 with lighter load to perform the second local reconstruction. According to the above, the management device determines the edge relay station set of the cell C6, i.e. the relay stations RS10, RS11 and RS13. And then, the management device determines possible handover target(s) cell to which each relay station may be handed over, based on the BRA, RRA and BRB. For the relay station RS10, its possible handover target cell is the cell C5; for the relay station RS11, its possible handover target cell is the cell C5; for the relay station RS13, its possible handover target cell is the cell C3.

The management device could determine the second local reconstruction scheme between the cell C6 and its neighboring cells C3 and C5 with lighter load, according to enumeration arithmetic or gene arithmetic or other arithmetic, based on the above minimum $$\sum_{Cell_j \in S} (NBL_j - BL_m)^2$$

criterion. Without loss of generality, taking that the management device determines to hand over the relay stations RS10 and RS11 to the cell C5 and to hand over the relay station RS13 to the cell C3 as example, i.e. the second local reconstruction scheme is determined, and the updated load distribution of each cell is shown in FIG. 8, wherein the load of the cell C1 is Load1=20, and the load of the cell C2 is Load2=50, and the load of the cell C3 is Load3=30, and the load of the cell C4 is Load4=40, and the load of the cell C5 is Load5=50, and the load of the cell C6 is Load6=60. In this case, none of the load of each cell exceeds the first predefined threshold 70. Thus the scheme of a network topology reconstruction is determined. And then the management device notifies the relay station(s) needing a handover to perform the handover operation, or notifies the handover controlling device, which dominates the relay station(s) needing a handover, to indicate the relay station(s) needing a handover to perform the handover operation.

It needs to be indicated that, in one network topology reconstruction, the management device could notify the relay station(s) needing a handover to perform the handover operation after the determination of each local reconstruction scheme, or could also notify the relay station(s) needing a handover in turn to perform the handover operation after the determination of all local reconstruction schemes. Besides, the management device is possibly an Element Management System, or an operation and maintenance system, or a base station, or a relay station, or other device of any type for realizing the network topology reconstruction function.

It also needs to be indicated that, although detailed description is given above in conjunction with FIG. 8 by taking the realization of network topology reconstruction with only relay station handover as example, it will be appreciated by those skilled in the art to realize the network topology reconstruction with a combination of the relay station handover and the mobile station handover by way of analogy. Unnecessary details will not be given in this disclosure.

Figure 9:
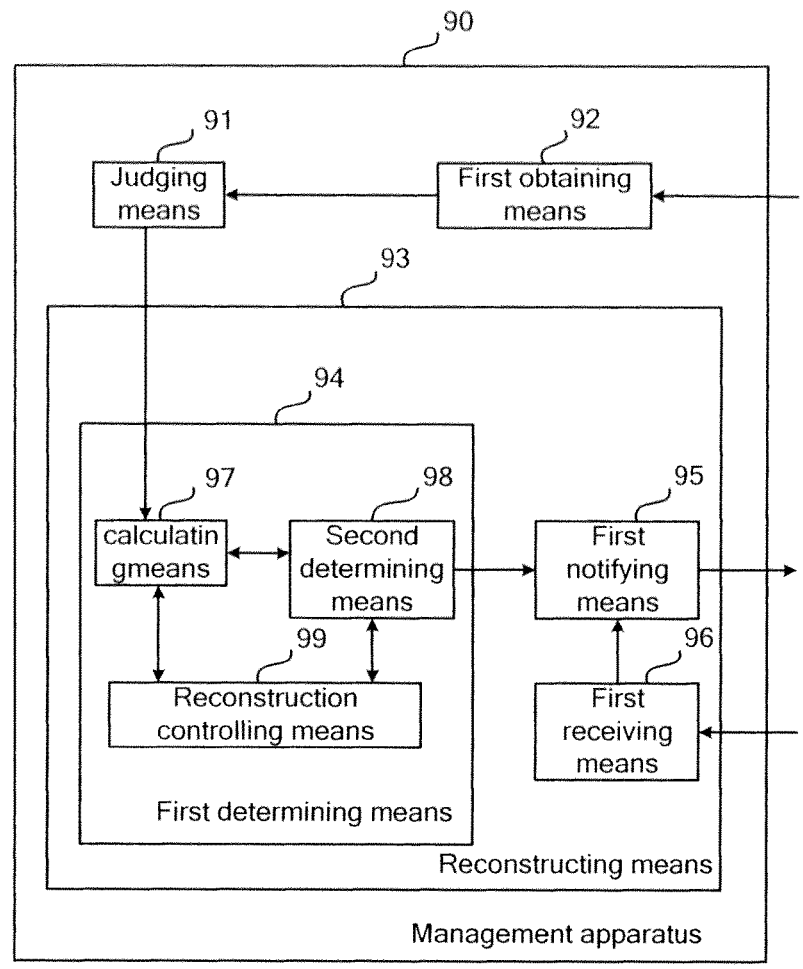
FIG. 9 shows the block diagram of a preferable structure of a management apparatus 90, in a management device in wireless relay communication network, for reconstructing the network topology of multiple cells in the domination of the management device, according to an embodiment of the present invention.

FIG. 9 shows the block diagram of a preferable structure of a management apparatus 90, in a management device in wireless relay communication network, for reconstructing the network topology of multiple cells in the domination of the management device, according to an embodiment of the present invention. The management apparatus 90 comprises a judging means 91, a first obtaining means 92 and a reconstructing means 93; wherein the reconstructing means 93 preferably comprises a first determining means 94, a first notifying means 95 and a first receiving means 96; wherein the first determining means 94 preferably comprises a calculating means 97, a second determining means 98 and a reconstruction controlling means 99.

The procedure of the management apparatus 90 shown in FIG. 9 reconstructing the network topology of multiple cells dominated by the management device will be described in detail as below.

The management apparatus 90 reconstructs the network topology of said multiple cells according to the traffic related information of said multiple cells.

Preferably, firstly, the first obtaining means 91 obtains the traffic related information of each of multiple cells respectively. Preferably, the first obtaining means 91 obtains the traffic related information of each of multiple cells from its base station or base station together with relay station.

The traffic related information of a cell includes the traffic related information applicable to the network topology reconstruction, or load related information as is named, including but not limited to a time-frequency resource related amount that is used by the traffic data in the cell, traffic throughout of each cell or the wireless channel quality of each cell for transmitting the traffic data, etc.

Preferably, time-frequency resource related amount that is used by the traffic data in a cell includes but not limited to the time-frequency resource amount used by all types of uplink and/or downlink traffic data of each cell, or the percent ratio of the time-frequency resource amount used by all types of uplink and/or downlink traffic data of each cell to all the time-frequency resource amount in that cell, or the weighed sum of the time-frequency resource amount used by all types of uplink and/or downlink traffic data of each cell, or the ratio of the weighed sum of the time-frequency resource amount used by all types of uplink and/or downlink traffic data of each cell to all the time-frequency resource amount in that cell, or a combination of any multiple items of the above, wherein the combination includes any combination mode advantageous for network topology reconstruction. Preferably, the weighed sum of the time-frequency resource amount used by all types of uplink and/or downlink traffic data includes the sum of the time-frequency resource amount used by all types of uplink and/or downlink traffic data weighted according to the traffic type.

Specific description will be given for wireless relay communication network by taking the time-frequency resource amount used by uplink and/or downlink traffic data of each cell as example of the traffic related information. The time-frequency resource amount used by uplink and/or downlink traffic data of a cell includes the sum of a time-frequency resource amount used by the traffic data carried by the access link between a base station and a mobile station directly communicating with the base station, a time-frequency resource amount used by the traffic data carried by the relay link between a base station and a relay station, and a time-frequency resource amount used by the traffic data carried by the relay link between a relay station and another relay station, a time-frequency resource amount used by the traffic data carried by the access link between a relay station and a mobile station.

In the case that the allocation of the time-frequency resource is entirely controlled by the base station, preferably, the first obtaining means 91 could directly obtain the traffic related information of each cell from the base station of each cell.

In the case that the base station allocates part of the time-frequency resource to a relay station for the relay station communicating with other relay stations or mobile stations dominated by the base station, and the relay station allocates said part of time-frequency resource by itself, the first obtaining means 91 could also obtain the traffic related information used by each relay station from each relay station, or each relay station reports its traffic related information to the base station and the base station reports all to the first obtaining means 91. Of course, in this case, the base station could also calculate the time-frequency resource amount used by the relay station and accordingly determine the traffic related information, according to the traffic data amount between a relay station and other relay station or mobile station dominated by the relay station and the adopted modulation and coding manner thereof, therefore the relay station needs not to report the traffic related information.

Subsequently, the judging means 92 judges whether the traffic related information of at least one cell in multiple cells satisfies a predefined condition.

Preferably, by taking example for a time-frequency resource related amount that is used by the traffic data in said cell in a predefined time duration using as the traffic related information, the predefined condition comprises whether the time-frequency resource related amount of each cell exceeds a first predefined threshold. For the first time of network topology reconstruction, the predefined tune duration could be the time spacing between the network startup and the startup of the first time of the network topology reconstruction, for the subsequent network topology reconstruction, the predefined time duration could be the time spacing between the success of the last network topology reconstruction and the startup of the current network topology reconstruction, or the predefined time duration could be set by the network administrator at will.

If the traffic related information of at least one cell in multiple cells satisfies the predefined condition, the reconstructing means 93 performs the network topology reconstruction.

Preferably, the function of the reconstructing means 93 could be realized by the first determining means 94, the first notifying means 95 and the first receiving means 96, respectively.

Firstly, if the traffic related information of at least one cell in said multiple cells satisfies the predefined condition, the first determining means 94 determines to hand over at least one relay station or at least one relay station together with at least one mobile station in each of said at least one cell in said multiple cells to a neighboring cell.

Subsequently, the first notifying means 95 notifies respectively at least one relay station or at least one relay station together with at least one mobile station in each of said at least one cell to perform handover operation, or notifies the base station of each of said at least one cell to indicate at least one relay station or at least one relay station together with at least one mobile station in the domination of the base station to perform handover operation, wherein, each notification comprises the handover related information of the neighboring cell to which each relay station or mobile station is going to be handed over.

Preferably, before notifying at least one relay station in each of said at least one cell, the first notifying means 95 respectively notifies the mobile station(s) dominated by at least one relay station in each of said at least one cell to perform handover operation.

Subsequently, the first receiving means 96 receives the handover done notification(s) from at least one relay station in each of said at least one cell, respectively;

Subsequently, according to the handover done notification, the first notifying means 95 notifies those mobile station(s) originally dominated by at least one relay station in each of said at least one cell to be handed over back to said at least one relay station, respectively.

In a multi-hop relay communication network, the relay stations in a cell could be classified into an intermediate relay station and an edge relay station. As shown in FIG. 5, in the network topology tree with the base station BSi as the root node, the leaf node is the edge relay station, and the middle node is the intermediate relay station. Generally, the leaf node locates in the edge of a cell or the cross border of two cells. Preferably, if the traffic related information of at least one cell in said multiple cells satisfies the predefined condition, the first determining means 94 determines to hand over at least one edge relay station or at least one edge relay station together with at least one mobile station in each of said at least one cell in said multiple cells to a neighboring cell; and the first notifying means 95 respectively notifies at least one edge relay station or at least one edge relay station together with at least one mobile station in each of said at least one cell to perform handover operation, or notifies the base station(s) in each of said at least one cell to indicate at least one edge relay station or at least one edge relay station together with at least one mobile station in the domination of the base station to perform handover operation.

Preferably, the network topology reconstruction scheme could adopt the distributed optimization manner, namely a network topology reconstruction consisting of multiple local reconstructions, wherein a local reconstruction indicates the network topology reconstruction in a local network consisting of a cell with its traffic related information satisfying the predetermined condition and its neighboring cell(s).

By taking the time-frequency resource amount used by the traffic data of a cell in a predetermined time duration as an example of the traffic related information of the cell, if the time-frequency resource related amount used by the traffic data of a cell exceeds the first predefined threshold, the cell could be regarded as a cell of heavier load, if the time-frequency resource related amount used by the traffic data of a cell doesn't exceed the first predefined threshold, the cell could be regarded as a cell of lighter load. For a cell with heavier load, a local reconstruction among the cell with heavier load and its neighboring cell(s) with lighter load could be performed so as to balance their load. If there are multiple cells with heavier load, the local reconstruction will be performed many times to realize the network topology reconstruction.

Preferably, the function of the first determining means 94 could be realized by the calculating means 97, the second determining means 98 and the reconstruction controlling means 99, respectively.

Firstly, for each of one or more cell having a time-frequency resource related amount used by the traffic data in the predefined time duration exceeding the first predefined threshold, the calculating means 97 calculates the sum of time-frequency resource related amount used by the traffic data of its one or more neighboring cells in said predefined time duration, each of said one or more neighboring cell having a time-frequency resource related amount used by the traffic data in said predefined time duration not exceeding said first predefined threshold.

Subsequently, for the cell Ci having a minimum sum of the time-frequency resource related amount used by the traffic data of its said one or more neighboring cells having a time-frequency resource related amount used by the traffic data in the predefined time duration being less than or equal to said first predefined threshold, the second determining means 98 is for determining to hand over at least one edge relay station or at least one edge relay station together with at least one mobile station in said cell Ci to its said one or more neighboring cells, so as to minimize $$\sum_{Cell_j \in S} (NBL_j - BL_m)^2,$$

wherein, S is the set that comprises cell Ci and its at least one neighboring cells having a time-frequency resource related amount used by the traffic data in the predefined time duration being less than or equal to said first predefined threshold: $NBL_j$ is, in the case that at least one edge relay station or at least one edge relay station together with at least one mobile station in cell Ci have been handed over from cell Ci to neighboring cell(s), the time-frequency resource related amount used, in said predefined time duration, by the traffic data of cell j in a set S recalculated under the network topology: $BL_m$ the mean value of the time-frequency resource related amount used, in said predefined time duration, by the traffic data of all cells in set S.

Lastly, the reconstruction controlling means 99 controls the calculating means 97 and the second determining means

98 to execute the calculation and determination process as above repeatedly, until the time-frequency resource related amount used by the traffic data of each of said multiple cells is less than or equal to the first predefined threshold. Thus, the current network topology construction is finished.

Figure 10:
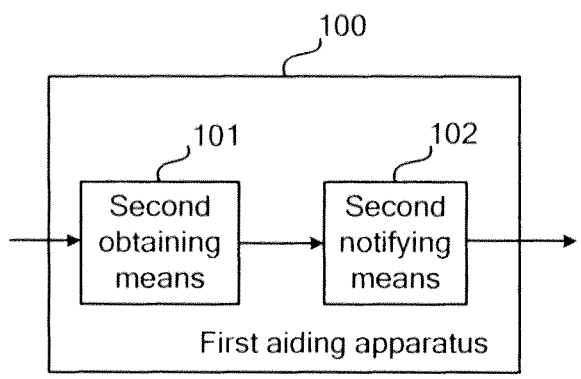
FIG. 10 shows the block diagram of a first aiding apparatus 100 in a base station of a wireless relay communication network, for aiding a management device to reconstruct the network topology, according to an embodiment of the present invention.

FIG. 10 shows the block diagram of a first aiding apparatus 100 in a base station of a wireless relay communication network, for aiding the management device to reconstruct the network topology, according to an embodiment of the present invention. The first aiding apparatus 100 comprises a second obtaining means 101 and a second notifying means 102.

The procedure of the first aiding apparatus 100 aiding the management device to reconstruct the network topology will be described in detail as below.

Firstly, the second obtaining means 101 obtains traffic related information of the cell(s) in the domination of said base station.

And then, the second notifying means 102 notifies said management device of said traffic related information.

Preferably, the traffic related information of said cell comprises the traffic related information in said base station and the traffic related information in at least one relay station in the domination of said base station. The second obtaining means 101 further obtains the traffic related information of said at least one relay station from said at least one relay station in the domination of said base station.

Preferably, the traffic related information of a cell comprises time-frequency resource related amount used by the traffic data of the cell in a predefined time duration. The traffic related information of said base station comprises time-frequency resource related amount used, in a predefined time duration, by the traffic data between said base station and mobile station(s) or relay station(s) in the direct domination of said base station; the traffic related information in a relay station comprises time-frequency resource related amount used, in a predefined time duration, by the traffic data between said relay station and the mobile station or relay station(s) in the direct domination of said relay station.

For the first time of network topology reconstruction, the predefined time duration could be the time spacing between the network startup and the startup of the first time of network topology reconstruction, for the subsequent network topology reconstruction, the predefined time duration could be the time spacing between the success of the last network topology reconstruction and the startup of the current network topology reconstruction, or the predefined time duration could be set by the network administrator at will.

Preferably, the time-frequency resource related amount used by the traffic data in each cell in a predefined time duration comprises the sum of time-frequency resource amount used by all types of uplink and/or downlink traffic data, or the ratio of the sum of time-frequency resource amount used by all types of uplink and/or downlink traffic data to all the time-frequency resource amount in that cell, or the weighed sum of the time-frequency resource amount used by all types of uplink and/or downlink traffic data, or the ratio of the weighed sum of the time-frequency resource amount used by all types of uplink and/or downlink traffic data to all the time-frequency resource amount in that cell. Wherein, the weighed sum of the time-frequency resource amount that is used by all types of uplink and/or downlink traffic data comprises the weighed sum of the time-frequency resource amount that is used by all types of uplink and/or downlink traffic data according to the traffic type.

The preferable embodiments of the invention are described in detail as above. Herein, it needs to be indicated that the above embodiments could be implemented alone, or could also be implemented in combination.

Figure 11:
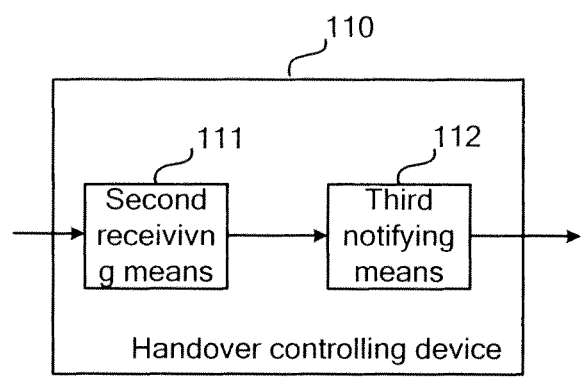
FIG. 11 shows the block diagram of a handover controlling apparatus 110, in a handover controlling device of a wireless relay communication network, for aiding a management device to reconstruct the network topology, according to an embodiment of the present invention.

FIG. 11 shows the block diagram of a handover controlling apparatus 110, in a handover controlling device of a wireless relay communication network, for aiding a management device to reconstruct the network topology, according to an embodiment of the present invention. The handover controlling apparatus 110 comprises a second receiving means 111 and a third notifying means 112.

The procedure of the handover controlling apparatus 110 aiding the management device to reconstruct the network topology will be described in detail as below.

Firstly, the second receiving means 111 receives a handover notification from said management device to notify said handover controlling device to indicate at least one relay station or at least one relay station together with at least one mobile station in the domination of said handover controlling device to perform handover operation, said notification comprises the handover related information of the neighboring cell to which each relay station or mobile station is going to be handed over.

And then, the third notifying means 112, according to the handover notification received by the second receiving means 111, respectively notifies said at least one relay station or said at least one relay station together with at least one mobile station to perform handover operation.

Preferably, before notifying said at least one relay station to perform handover operation, the third notifying means 112 further notifies mobile station(s) in the domination of said at least one relay station to perform handover operation.

Subsequently, the second receiving means 111 receives the handover done notification(s) from said at least one relay station; and then the third notification means 112, according to said handover done notification(d), notifies the mobile station(s) originally in the domination of said at least one relay station to be handed over back to the domination of said at least one relay station.

Preferably, the handover related information comprises an identifier of the cell to which the relay station or the mobile station is going to be handed over, or a synchronization code identifier of said cell, or a synchronization code of said cell, or a frequency information of the carrier of said cell.

It needs to be indicated that, handover controlling device is possibly a base station or a base station controller of a radio network controller or other device for controlling the relay station handover or the mobile station handover.

Figure 12:
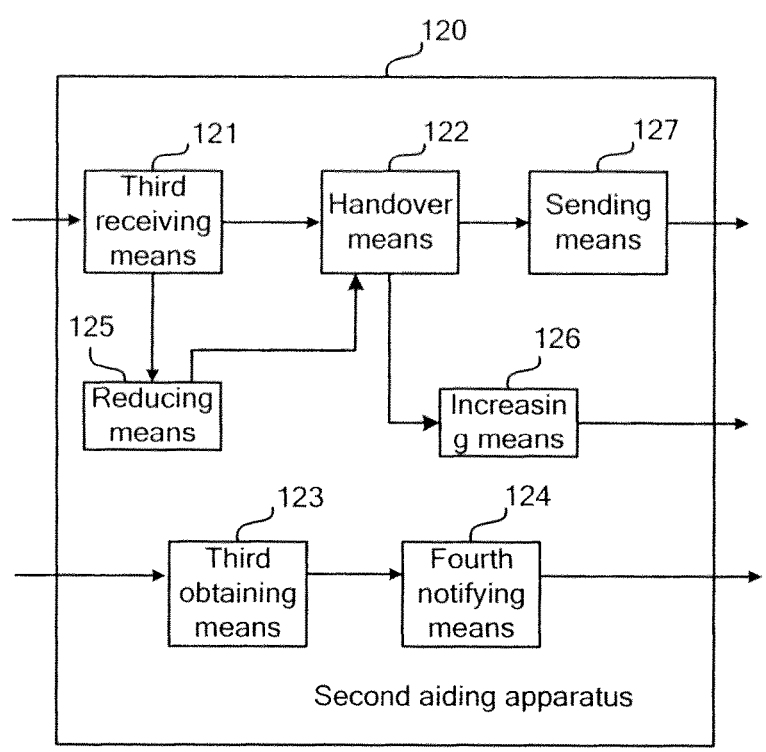
FIG. 12 shows the block diagram of a second aiding apparatus 120 in a relay station of a wireless relay communication network, for aiding a management device to reconstruct the network topology, according to an embodiment of the present invention.

FIG. 12 shows the block diagram of a second aiding apparatus 120 in a relay station of a wireless relay communication network, for aiding a management device to reconstruct the network topology, according to an embodiment of the present invention. The second aiding apparatus 120 comprises a third receiving means 121, a handover means 122, a third obtaining means 123, a fourth notifying means 124, a reducing means 125, an increasing means 126 and a sending means 127. It should be appreciated by those skilled in the art with the guidance in this disclosure that, the third receiving means 121 and the handover means 122 are indispensable, whereas the other means are optional.

The procedure of the second aiding apparatus 120 aiding the management device to reconstruct the network topology will be described in detail as below.

Firstly, the third receiving means 121 receives a handover notification from a management device or a handover controlling device to which said relay station belongs, said handover notification comprises the handover related information of the neighboring cell to which said relay station is going to be handed over. The handover related information comprises an identifier of the cell to which the relay station is going to be handed over, or a synchronization code identifier of said cell, or asynchronization code of said cell, or a frequency information of the carrier of said cell.

And then, the handover means 122, according to said handover notification, performs handover operation.

Preferably, before the handover means 122 performing the handover operation, the reducing means 125 reduces the transmitting power of said relay station below a second predefined threshold, so that mobile station(s) in the domination of said relay station is(are) handed over to the domination of other base station or relay station.

Preferably, the increasing means 126 increases the transmitting power of said relay station over a third predefined threshold after said handover means 122 completes the handover.

Preferably, the sending means 127 sends a handover done notification to said management device or base station to which said relay station belongs, after said handover means completes the handover.

Preferably, the third obtaining means 123 obtains the traffic related information of said relay station, and then the fourth notifying means 124 notifies the base station to which said relay station belongs or said management device of said traffic related information in said relay station. Preferably, said traffic related information in said relay station comprises time-frequency resource related amount used by the traffic data between said relay station and the mobile station(s) or relay stations) in the direct domination of said relay station in a predefined time duration. For the first time of network topology reconstruction, the predefined time duration could be the time spacing between the network startup and the startup of the first time of network topology reconstruction, for the subsequent network topology reconstruction, the predefined time duration could be the time spacing between the success of the last network topology reconstruction and the startup of the current network topology reconstruction, or the predefined time duration could be set by the network administrator at will.

Preferably, said time-frequency resource related amount comprises the sum of time-frequency resource amount used by all types of uplink and/or downlink traffic data, or the ratio of the sum of time-frequency resource amount used by all types of uplink and/or downlink traffic data to all the time-frequency resource amount in that cell, or the weighed sum of the time-frequency resource amount used by all types of uplink and/or downlink traffic data, or the ratio of the weighed sum of the time-frequency resource amount used by all types of uplink and/or downlink traffic data to all the time-frequency resource amount in that cell. Preferably, the weighed sum of the time-frequency resource amount used by all types of uplink and/or downlink traffic data comprises the weighed sum of the time-frequency resource amount used by all types of uplink and/or downlink traffic data according to the traffic type.

The embodiments of the present invention have been described above. It is intelligible to those skilled in the art that, the present invention is not limited to above specific equipments, and various modifications or alterations can be made by those skilled in the art without departing from the scope as defined by the appended claims. The technical solutions in the present invention could be realized either by software or by hardware.

REFERENCE 1. http://www.ieee802.org/16/tgm/contrib/C80216m-08_075.ppt
2. http://www.ieee802.org/16/tgm/contrib/S80216m-07_169.pdf
3. http://www.ieee802.org/16/tgm/contrib/C80216m-07_169.doc

What is claimed is:

1. A method, in a management device in wireless relay communication network, for reconstructing the network topology of multiple cells in the domination of said management device, wherein, the network topology of said multiple cells is reconstructed according to a traffic related information of said multiple cells, the method further comprising:
   a. obtaining the traffic related information of each cell in said multiple cells respectively;
   b. judging whether the traffic related information of at least one cell in said multiple cells satisfies a predefined condition;
   c. performing load balancing among the multiple cells by reconstructing the network topology when the traffic related information of at least one cell in said multiple cells satisfies the predefined condition, wherein:
      c1. if the traffic related information of at least one cell in said multiple cells satisfies the predefined condition, determining to hand over at least one relay station or at least one relay station together with at least one mobile station in each of said at least one cell to a neighboring cell;
      c3. notifying respectively at least one relay station or at least one relay station together with at least one mobile station in each of said at least one cell to perform handover operation, or notifying a handover controlling device to which each of said at least one cell belongs, to indicate at least one relay station or at least one relay station together with at least one mobile station in the domination of said handover controlling device to perform handover operation, wherein, each notification comprises the handover related information of the neighboring cell to which each relay station or mobile station is going to be handed over.

2. A method according to claim 1, wherein, said traffic related information of each cell comprises time-frequency resource related amount that is used by the traffic data in said cell in a predefined time duration, said predefined condition comprises whether said time-frequency resource related amount exceeds a first predefined threshold.

3. A method according to claim 2, wherein, said act c1 comprises:
   c11. for each of one or more cell having a time-frequency resource related amount used by the traffic data in said predefined time duration exceeding said first predefined threshold, calculating the sum of time-frequency resource related amount used by the traffic data of its one or more neighboring cells in said predefined time duration, each of said one or more neighboring cell having a time-frequency resource related amount used by the traffic data in said predefined time duration being less than or equal to said first predefined threshold;
   c12. for the cell i having a minimum sum of the time-frequency resource related amount used by the traffic data of its said one or more neighboring cells, determining to hand over at least one edge relay station or at least one edge relay station together with at least one mobile station in said cell i to its said one or more neighboring cells, so as to minimize $$\sum_{Cell_j \in S} (NBL_j - BL_m)^2,$$

wherein, S is the set that comprises cell i and cell i's at least one neighboring cell, time-frequency resource related amount used by whose traffic data in said predefined time duration is less than or equal to said first predefined threshold; $NBL_j$ is the time-frequency resource related amount used, in a predefined time duration, by the traffic data of cell j in a set S recalculated under a network topology assuming at least one edge relay station or at least one edge relay station together with at least one mobile station being handed over from cell i to its neighboring cell(s); $BL_m$ is the mean value of the time-frequency resource related amount used, in said predefined time duration, by the traffic data of all cells in set S;

repeatedly executing act c11 and act c12, until the time-frequency resource related amount used, in said predefined time duration, by the traffic data of each cell in said multiple cells is lower than or equal to said first predefined threshold.

4. A method according to claim 2, wherein, said time-frequency resource related amount used, in said predefined time duration, by the traffic data of each cell, comprises any one or the combination of several items of the followings:
the sum of time-frequency resource amount used by all types of uplink and/or downlink traffic data;
the ratio of the sum of time-frequency resource amount used by all types of uplink and/or downlink traffic data to all the time-frequency resource amount in that cell;
the weighed sum of the time-frequency resource amount used by all types of uplink and/or downlink traffic data;
the ratio of the weighed sum of the time-frequency resource amount used by all types of uplink and/or downlink traffic data to all the time-frequency resource amount in that cell.

5. A method according to claim 4, wherein, the weighed sum of the time-frequency resource amount that is used by all types of uplink and/or downlink traffic data comprises the weighed sum of the time-frequency resource amount that is used by all types of uplink and/or downlink traffic data according to the traffic type.

6. A method in a base station of a wireless relay communication network, for aiding a management device to reconstruct a network topology, wherein, said method comprising:
A. obtaining traffic related information of the cell(s) in the domination of said base station;
B. notifying said management device of said traffic related information;
b. judging whether the traffic related information of at least one cell in said multiple cells satisfies a predefined condition;
c. performing load balancing among the multiple cells by reconstructing the network topology when the traffic related information of at least one cell in said multiple cells satisfies the predefined condition, wherein:
c1. if the traffic related information of at least one cell in said multiple cells satisfies the predefined condition, determining to hand over at least one relay station or at least one relay station together with at least one mobile station in each of said at least one cell to a neighboring cell;
c3. notifying respectively at least one relay station or at least one relay station together with at least one mobile station in each of said at least one cell to perform handover operation, or notifying a handover controlling device to which each of said at least one cell belongs, to indicate at least one relay station or at least one relay station together with at least one mobile station in the domination of said handover controlling device to perform handover operation, wherein, each notification comprises the handover related information of the neighboring cell to which each relay station or mobile station is going to be handed over.

7. A method in a handover controlling device of a wireless relay communication network, for aiding a management device to reconstruct the network topology, said method comprising:
i. receiving a handover notification from said management device to notify said handover controlling device to indicate at least one stationary relay station or at least one stationary relay station together with at least one mobile station in the domination of said handover controlling device to perform handover operation, said notification comprises the handover related information of the neighboring cell to which each stationary relay station or mobile station is going to be handed over;
ii. according to said handover notification, respectively notifying said at least one stationary relay station or at least one stationary relay station together with at least one mobile station to perform handover operation.

8. A method in a stationary relay station of a wireless relay communication network, for aiding a management device to reconstruct the network topology, said method comprising:
I. receiving a handover notification from a management device or a handover controlling device to which said stationary relay station belongs, said handover notification comprises the handover related information of the neighboring cell to which said stationary relay station is going to be handed over;
II. according to said handover notification, performing the handover operation.

9. A management apparatus in a management device in wireless relay communication network, for reconstructing the network topology of multiple cells in the domination of said management device, wherein, the network topology of said multiple cells is reconstructed according to a traffic related information of said multiple cells, and wherein the management device comprises:
a first obtaining module, for obtaining the traffic related information of each cell in said multiple cells respectively;
a judging module, for judging whether the traffic related information of at least one cell in said multiple cells satisfies a predefined condition;
a reconstructing module, for reconstructing the network topology, if the traffic related information of at least one cells in said multiple cells satisfies the predefined condition, wherein:
if the traffic related information of at least one cell in said multiple cells satisfies the predefined condition, the management device is configured to determine to hand over at least one relay station or at least one relay station together with at least one mobile station in each of said at least one cell to a neighboring cell;
wherein the management device is further configured to notify respectively at least one relay station or at least one relay station together with at least one mobile station in each of said at least one cell to perform handover operation, or to notify a handover controlling device to which each of said at least one cell belongs, to indicate at least one relay station or at least one relay station together with at least one mobile station in the domination of said handover controlling device to perform handover operation, wherein, each notification comprises the handover related information of the neighboring cell to which each relay station or mobile station is going to be handed over.

10. A first aiding apparatus in a base station of a wireless relay communication network, for aiding a management device to reconstruct a network topology, comprising:
an obtaining module, for obtaining traffic related information of the cell(s) in the domination of said base station;
a notifying module, for notifying said management device of said traffic related information;
wherein the management device comprises:
a judging module, for judging whether the traffic related information of at least one cell in said multiple cells satisfies a predefined condition;
a reconstructing module, for reconstructing the network topology, if the traffic related information of at least one cells in said multiple cells satisfies the predefined condition, wherein:
if the traffic related information of at least one cell in said multiple cells satisfies the predefined condition, the management device is configured to determine to hand over at least one relay station or at least one relay station together with at least one mobile station in each of said at least one cell to a neighboring cell;
wherein the management device is further configured to notify respectively at least one relay station or at least one relay station together with at least one mobile station in each of said at least one cell to perform handover operation, or to notify a handover controlling device to which each of said at least one cell belongs, to indicate at least one relay station or at least one relay station together with at least one mobile station in the domination of said handover controlling device to perform handover operation, wherein, each notification comprises the handover related information of the neighboring cell to which each relay station or mobile station is going to be handed over.

11. A handover controlling apparatus, in a handover controlling device of a wireless relay communication network, for aiding a management device to reconstruct the network topology, comprising:
a second receiving module, for receiving a handover notification from said management device to notify said handover controlling device to indicate at least one stationary relay station or at least one stationary relay station together with at least one mobile station in the domination of said handover controlling device to perform handover operation, said notification comprises the handover related information of the neighboring cell to which each stationary relay station or mobile station is going to be handed over;
a third notifying module, for according to said handover notification, respectively notifying said at least one stationary relay station or said at least one stationary relay station together with at least one mobile station to perform handover operation.

12. A second aiding apparatus in a stationary relay station of a wireless relay communication network, for aiding a management device to reconstruct the network topology, comprising:
a third receiving module, for receiving a handover notification from a management device or a handover controlling device to which said stationary relay station belongs, said handover notification comprises the handover related information of the neighboring cell to which said stationary relay station is going to be handed over;
a handover module, for performing handover operation according to said handover notification.

* * * * *